United States Patent [19]
Pratt

[11] Patent Number: 5,884,923
[45] Date of Patent: Mar. 23, 1999

[54] FASTENER SYSTEM WITH EXPANDABLE NUT BODY

[75] Inventor: John D. Pratt, Laguna Niguel, Calif.

[73] Assignee: Textron Inc., Providence, R.I.

[21] Appl. No.: 614,741

[22] Filed: Mar. 13, 1996

[51] Int. Cl.[6] .................................................. A63C 17/06
[52] U.S. Cl. .................................... 280/11.22; 280/11.27; 301/53
[58] Field of Search .......................... 301/5.3; 280/11.22, 280/11.27, 11.23

[56] References Cited

U.S. PATENT DOCUMENTS

| | | |
|---|---|---|
| 2,207,476 | 7/1940 | Bernstein . |
| 3,414,304 | 12/1968 | Miller . |
| 4,004,486 | 1/1977 | Schenk ........................................ 85/64 |
| 4,445,289 | 5/1984 | Beneteau . |
| 4,909,523 | 3/1990 | Olson . |
| 5,028,058 | 7/1991 | Olson . |
| 5,048,848 | 9/1991 | Olson et al. . |
| 5,068,956 | 12/1991 | Malewicz . |
| 5,092,614 | 3/1992 | Malewicz . |
| 5,190,393 | 3/1993 | Svensson ............................... 403/370 |
| 5,356,209 | 10/1994 | Hill . |
| 5,386,651 | 2/1995 | Okamoto . |
| 5,454,676 | 10/1995 | Conte . |
| 5,470,086 | 11/1995 | Peterson et al. ...................... 280/11.22 |
| 5,480,168 | 1/1996 | Chen .................................... 280/11.22 |

FOREIGN PATENT DOCUMENTS

| | | |
|---|---|---|
| 624049 | 5/1949 | United Kingdom . |
| 9426366 | 11/1994 | WIPO . |
| 9503861 | 2/1995 | WIPO . |

Primary Examiner—J. J. Swann
Assistant Examiner—Avraham Lerner
Attorney, Agent, or Firm—Trexler, Bushnell, Giangiorgi & Blackstone, Ltd.

[57] ABSTRACT

A novel quick release fastener system for efficient and reliable attachment, disengagement and reattachment of components secured by the fastener system. The fastener system includes an elongated fastener having a shank, a drive structure on one end, an opposite end of which having a threaded portion. The fastener system also includes an expandable nut body which is engaged with the threaded portion of the fastener, which nut body is adapted to be engaged in a bore. Nut spreading structures are provided on the nut member and the fastener which spread or expand the nut when the fastener is rotated and engaged axially of the nut member. The nut is initially retained on the threaded portion of the fastener with the nut spreading structures disengaged. A work piece is provided with a bore for receiving the expandable nut body. A key is provided in the bore and a slot is provided in the nut body being sized and dimensioned for receiving the key therein. The slot allows the nut body to expand with the key engaged in the slot preventing the nut body from rotating in the bore. Nominal rotation of the fastener relative to the nut results in engaging of the nut spreading structures on the fastener and nut to expand the nut body and thereby forcibly contact and engage abutting inside surfaces of the bore. The fastener system is particularly useful in attaching wheel assemblies to an in-line skate and for attaching cleats to footwear, or similar such assembly or fastener uses.

9 Claims, 9 Drawing Sheets

FASTENER SYSTEM WITH EXPANDABLE NUT BODY

BACKGROUND

This invention is generally directed to a novel quick release, quick attach fastener system. The present invention relates to a fastener system which includes a fastener and an expandable nut body engaged with the fastener, wherein the nut body is adapted for engagement in a bore. More particularly, the present invention relates to a fastener system for use in quickly and easily removing, attaching, and/or adjusting wheel assemblies used with in-line skates and for quickly and easily removing and attaching cleats in footwear, or the like.

A variety of fastener systems are currently in use for attaching a wheel assembly to in-line roller skates. A typical fastener system includes a fastener having a head, shank and threaded portion formed on the shank opposite the head. The threaded portion is engageable with a corresponding threaded nut. A chassis or frame portion of an in-line skate is provided with structures for retaining a plurality of wheel assemblies in generally linear alignment. Each wheel assembly is retained on the frame by a fastener which is inserted through one side of the frame and extends through a bore formed therein through a central sleeve bore in the wheel assembly, and through an opposing bore in the frame. The nut is engaged with the threaded portion of the fastener thereby securing the wheel assembly in position relative to the frame.

One of the problems with prior art fastener systems is that it is time consuming to remove the wheel assembly for purposes of repair, replacement or for adjusting the wheels to reconfigure or reposition the wheels of the skates, or for example, to provide a "rockering" effect. While the ordinary skater may not be concerned about the time to replace one or more wheel assemblies, there are many situations in which rapid repair and replacement are important, such as in competitive in-line hockey. Moreover, easy, efficient and reliable removal and replacement of wheels are important for the initial assembly of in-line skates as well as the repair of in-line skates by repair professionals.

Increasing popularity of competitive sports which use in-line skates has increased the demand for fast, efficient and reliable removal and replacement of the wheel assemblies. For example, in-line skate hockey is an increasingly popular sport both at the professional level, as well as the amateur level. Further, there are numerous races throughout the country in which in-line skaters race for distance, as well as time. In these applications, fast, efficient and reliable removal and replacement of wheel assemblies is critical. Even recreational in-line skaters may need to replace wheel assemblies either for purposes of repairs or for using a different composition of wheel material depending on the surface in which they plan to skate. While speed and efficiency may not be a requirement, it would still be desirable to make the wheel repair or replacement as quick and as easy as possible for the recreational skater.

Ease of use and reliability of a fastener system are also important for recreational, amateur and professional competitors when they desire to reconfigure their in-line skates for such purposes as a "rockering" configuration. Whereas in-line skates typically are configured with the wheels generally abutting or tangent to a common plane or skating surface, a "rockering" configuration moves one or more end wheels out of the common plane, thereby providing an approximated curved surface. The rocketing configuration is analogous to a hockey skate whereby the blade of the skate is ground with a slight convex arch rather than being a flat blade as is used in figure skating. As such, it should be clear, that it would be desirable to quickly and easily reconfigure in-line skating wheel assemblies for such uses.

Another problem with the prior art is that the hardware associated with the fastener system typically is provided in multiple components, including at least the elongated fastener/axle and an engaged nut. The fact that these fastener systems involve two or more components which must be separated to remove, attach or adjust the wheels can result in losing a component thereby further increasing the time to effect the operation on a wheel assembly. Because the nut is not captively retained on the fastener/axle, the nut may fall away and become lost thereby requiring the person replacing the wheel assembly to find another nut in order to proceed. The problem is exacerbated by the fact that it may be desirable to have a recessed nut thereby requiring the nut to be positioned in a recessed area to prevent damage to the nut. By recessing the nut, the problem is complicated by trying to align the threaded portion of the fastener through the sleeve bore of the wheel and the opposite opening on the opposite portion of the frame.

Examples of prior art fastener systems for use on in-line skates are shown in the following United States patents: U.S. Pat. No. 4,909,523 issued Mar. 20, 1990 to Olson; U.S. Pat. No. 5,028,058, issued Jul. 2, 1991 to Olson; U.S. Pat. No. 5,048,848, issued Sep. 17, 1991 to Olson et al.; U.S. Pat. No. 5,068,956, issued Dec. 3, 1991 to Malewicz; and U.S. Pat. No. 5,092,614, issued Mar. 3, 1992 to Malewicz. The device as shown in Malewicz '956 employs a cap which covers a nut thereby eliminating the need to recess the nut. However, the device in Malewicz '956 still requires numerous rotations of a fastener to securely engage the fastener with the nut. The requirement of numerous rotations of the fastener to engage it securely with a nut is found in each of the references cited hereinabove.

Athletic footwear cleat systems is another application in which quick, easy and reliable removal and replacement of a device is required. Athletic footwear cleats are widely used for a variety of sporting activities. For example, cleats are used in professional and amateur sports such as soccer, baseball, football, track and field, and rugby, to name a few. Periodically, it becomes necessary to replace cleats as they become worn or damaged or to change cleats depending on the type of surface used for a playing field.

Typically, prior art cleat systems employ a nut body which is molded into the sole of athletic footwear. A threaded cleat is driven into the in-molded nut body. While these cleat systems provide secure engagement of cleats with the sole of footwear, such engagement can be time consuming.

With the foregoing examples of the in-line skate wheel assembly fastener system and the athletic footwear cleat system in mind, it should be clear that there are many other applications which would benefit from a fastener system which improves the speed, efficiency and reliability of fastener removal and replacement.

OBJECTS AND SUMMARY

A general object satisfied by the claimed invention is to provide a fastener system for rapid, efficient and reliable fastening and removal of a component retained thereby.

A further object satisfied by the claimed invention is to provide a fastener system which can be employed as an axle for use with an in-line skate to retain a wheel assembly thereof in rotary position relative to a frame of the in-line skate.

Yet a further object satisfied by the claimed invention is to provide a fastener system which can be used to attach a cleat to footwear and which allows rapid, efficient and reliable connection of a cleat in the footwear.

Yet a further object satisfied by the claimed invention is a fastener system which allows for quick adjustment of a wheel assembly in an in-line skate.

Briefly, and in accordance with the foregoing, the present invention envisions a novel quick release fastener system for efficient and reliable attachment, disengagement and reattachment of a component secured by the fastener system. The system of the invention includes an elongated fastener member having a shank, one end of which having a drive structure, an opposite end of which having a threaded portion. The fastener system also includes a nut member which is engaged with the threaded portion of the fastener and is adapted for engagement in a bore wheel cover that is circular or polygonal. Nut spreading structures are provided on the nut and the fastener which provide for spreading or enlarging of the nut when the fastener is rotated and engaged therein. The nut is initially retained on the threaded portion of the fastener with the nut spreading structures disengaged. A work piece is provided with a bore for receiving the nut. A key or equivalent structure is formed in the bore and a slot or equivalent structure is provided on the nut, which is sized and dimensioned for receiving the key therein. The slot allows the nut to spread or expand, with the key engaging the slot preventing the nut from rotating in the bore. Nominal rotation of the fastener relative to the nut, approximately a 90° or a quarter turn, results in engaging the nut spreading structures on the fastener and nut to expand or spread the nut and thereby causing the exterior of the nut to forcibly contact and engage the inside surfaces of the bore. The fastener system is particularly useful in attaching wheel assemblies to an in-line skate and for attaching cleats to footwear, as the wheels or cleats can be removed or attached with but a quarter turn of the fastener. More specifically, with regard to an in-line skate apparatus, the elongated fastener functions as an axle to hold a wheel assembly in position. As such, a quarter turn of the fastener will release the nut component from engagement in an associated bore. The fastener/axle, with the expandable nut attached, can be removed, the wheel replaced and the fastener/axle re-inserted and then affixed with a quarter turn of the fastener.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which.

DESCRIPTION

Figure 1:
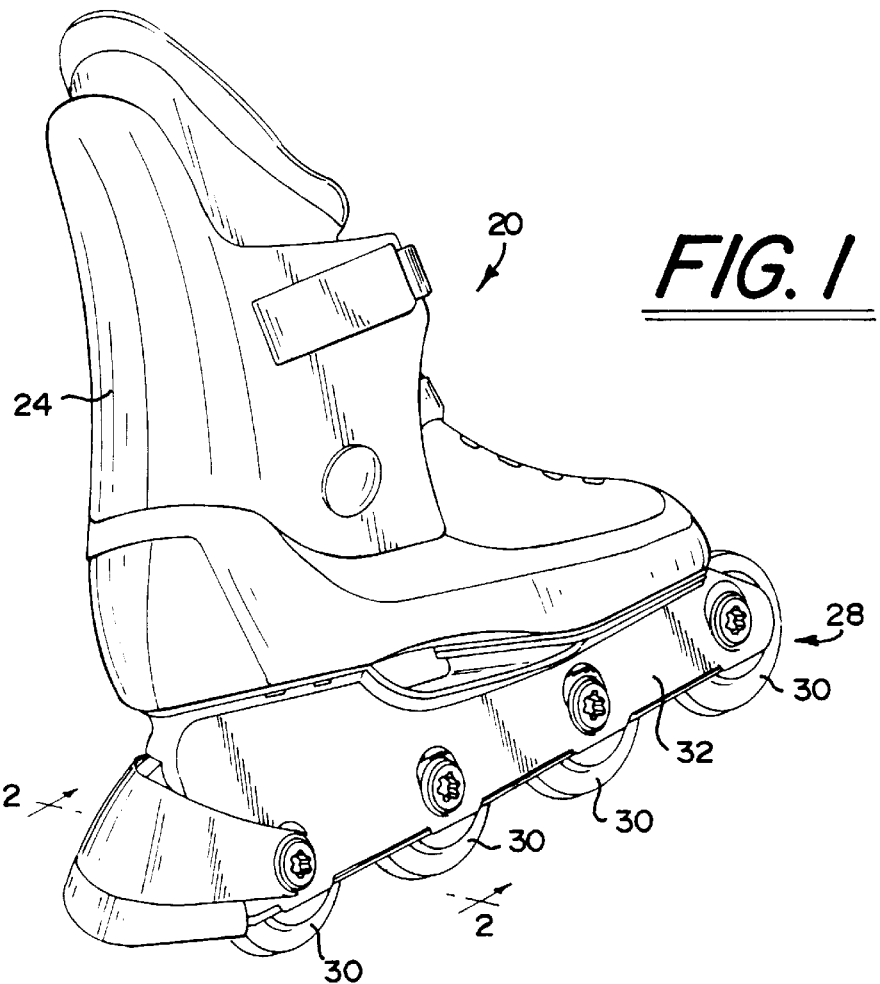
FIG. 1 is a perspective view of a typical in-line skate showing a boot portion, a frame, and a plurality of wheel assemblies attached to the frame.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

FIG. 1 shows a single roller skate 20 of the type often referred to as "in-line" roller skates. The in-line roller skate 20 includes a boot portion 24 and a wheel frame 28 attached to the boot 24. The wheel frame 28 retains a plurality of wheel assemblies 30 in linear alignment. With further reference to FIGS. 2–7, the wheel frame 28 includes a first side rail 32 and a second side rail 36. The side rails 32,36 are spaced apart and define a channel 40 therebetween. Each of the wheel assemblies 30 is retained in a desired position in the channel 40 by a fastener/axle system 44.

The fastener system 44 provides an axle and structures for retaining the axle in engagement with the first and second side rails 32,36. The fastener system 44 includes a fastener 48, an expandable nut body 52 and nut spreading structures 56 on both the fastener 48 and nut body 52. The fastener 48 has a shank 60 with a drive structure 64 on a first end thereof and a threaded portion 68 on an end of the shank 60 opposite the drive structure 64.

The expandable nut body 52 is provided in the form of a single wall structure 72 having two ends 74,76 which are spaced apart forming a slot 78 therebetween. The wall 72 defines an exterior surface 82 and an interior surface 86. Threads 90 are provided on the interior surface 86 to engage threads 94 on the threaded portion 68 of the fastener 48. The nut 52 is adapted to be disposed in a bore with the exterior surface 82 engaged with the surface portion of the bore.

The nut spreading structures 56 include a tapered surface 98 on the shank 60 of the fastener and a nut tapered surface 102 on a leading end 104 of the nut. The tapered surfaces 98,102 are brought into close position by threading the fastener 48 into the nut body 52. Continued rotation or engagement of the fastener 48 in the nut 52 will result in engaging the tapered surfaces 98,102 (see, FIGS. 2 and 5), which will produce a spreading or expanding of the split nut 52.

The nut body 52 has an exterior dimension (as represented by measurement 108 in FIG. 6) which is increased upon continued rotation of the fastener 48 in the nut body 52 after the tapered surfaces 98,102 make contact. A preferred embodiment of the present invention includes threads 90,94 which are sized and dimensioned such that a quarter turn, approximately 90° rotation, of the fastener 48 relative to the nut body, once the tapered surfaces 98,102 are engaged, will result in expanding or spreading the nut body 52. The expansion mechanism of the nut spreading structures 56 and the forces created thereby provide secure attachment of the fastener/axle system 44 for use in an article such as the skate 20 shown in FIG. 1.

Figure 2:
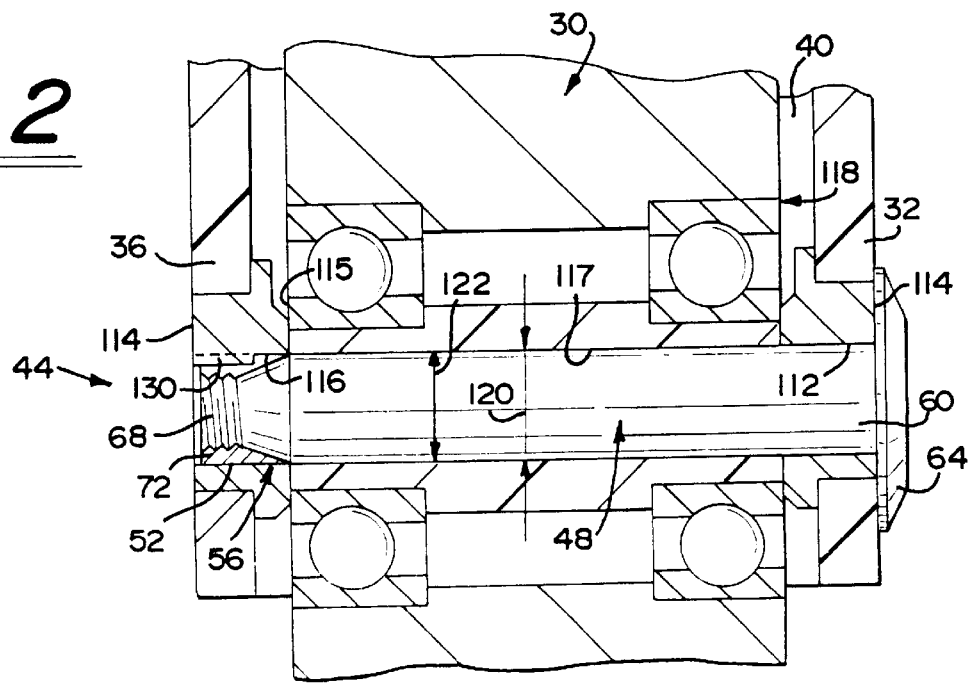
FIG. 2 is an enlarged, partial fragmentary, cross-sectional, elevational view of a wheel assembly and a portion of the frame taken along line 2—2 in FIG. 1 showing a novel fastener system of the present invention with a fastener engaged with an expandable nut to retain a wheel assembly on the frame of the skate.

With further reference to FIGS. 2–7, FIG. 2 is a partial fragmentary, cross-sectional side elevational view of a wheel assembly 30 which is retained in the channel 40 between the first and second side rails 32,36 by the fastener system 44. Bushings 114 are provided in the embodiment as shown in FIGS. 2–7. As will be described in greater detail hereinbelow, the bushings 114 may be replaced or obviated but are found in many models of skates 20 for purposes of replacement and adjustment of wheel assemblies 30. As shown in FIG. 2, the fastener extends through a first axle aperture 112 defined by a bore in the bushing 114 with a portion of the shank 60 retained in the axle aperture 112. The nut 52 is inserted through the first axle aperture 112 and positioned in a second axle aperture 116 defined by a bore in a receptacle body or second bushing 114. A portion of the shank is positioned in an axle bore 117 in a bearing assembly 118 of the wheel, and provide an axle upon which the wheel 30 is mounted. The details of the bearing assembly 118 are not elaborated on herein and are of generally known construction.

It should be also be noted that an exterior dimension 120 of the shank 60 and the exterior dimension 108 of the non-expanded nut body 52 are generally equal and are equal to or slightly smaller than an interior dimension 122 of the axle bore 117 and the axle apertures 112, 116. These dimensional relationships allow the fastener system 44 to be attached to the first and second rails 32,36 and through the wheel assembly 30 by axially inserting the nut body 52 attached to the fastener 48 through the first axle aperture 112, through the sleeve bore 126, and into the second axle aperture 116. This assembly eliminates the need to thread the fastener 48 onto the nut 52 which can be a complicated, time-consuming and unreliable process.

Additionally, a key 130 is provided in the second axle aperture 116. The key 130 is received in the slot 78. Engagement of the key 130 in the slot 78 prevents rotation of the nut body 52 relative to the second side rail 36 upon rotating the fastener 48 in the nut body 52, yet permits the nut 52 to expand into engagement with the bore. The key 130 is sized and dimensioned smaller than the slot 78 to minimize binding between the two structures when the nut 52 is engaged with the key 130.

Figure 3:
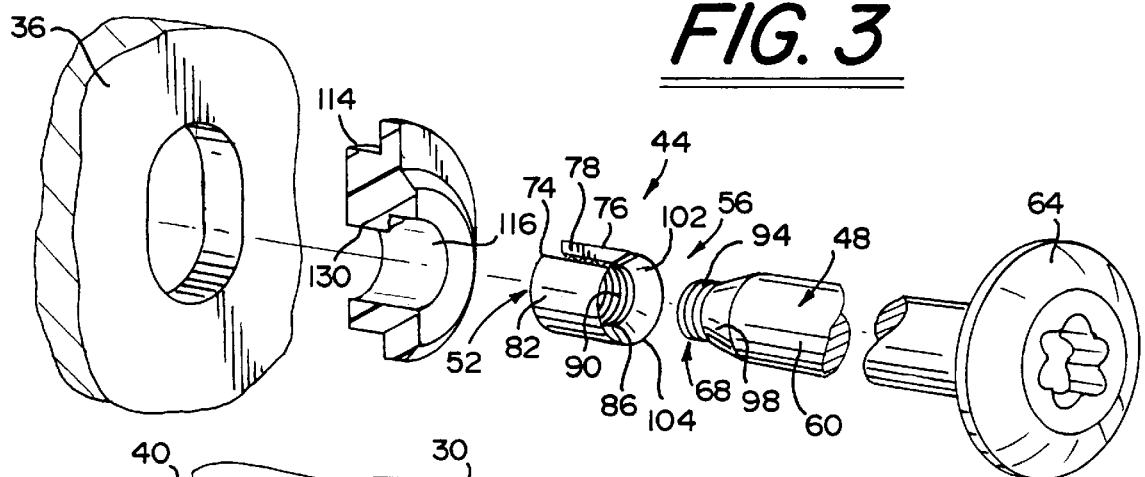
FIG. 3 is a partial fragmentary, exploded, perspective view of the novel fastener system of the present invention showing a bushing in cross-section and the nut in perspective to illustrate the relationship between a slot in the nut and a key in the bushing.

As shown in FIG. 2, the fastener system 44 has been attached to the first side rail 32, the second side rail 36, extending through the wheel assembly 30. The fastener 48 has been rotated 90° relative to the nut body 52 thereby forcing the fastener tapered surface 98 into expansive engagement with the nut tapered surface 102. Engagement of the nut spreading structures 56 results in spreading or expanding of the nut 52 creating a compressive, frictional engagement between the exterior surface 82 of the nut 52 and an internal surface of the second axle aperture 116. The drawings show a frictional engagement between the exterior surface 82 of the nut 52 and the internal surface of the aperture 116. It is envisioned that other forms of engaging structures such as mechanical interlocks may be employed with the nut 52 of the fastener/axle system 44 of the present invention. The drive structure 64 includes an enlarged head 136 which retains the fastener against a face 138 of the first side rail 132. FIG. 3 provides an exploded perspective view to further illustrate the tapered surfaces 102, 104 and the relationship of the key 130 to the slot 78.

Figure 4:
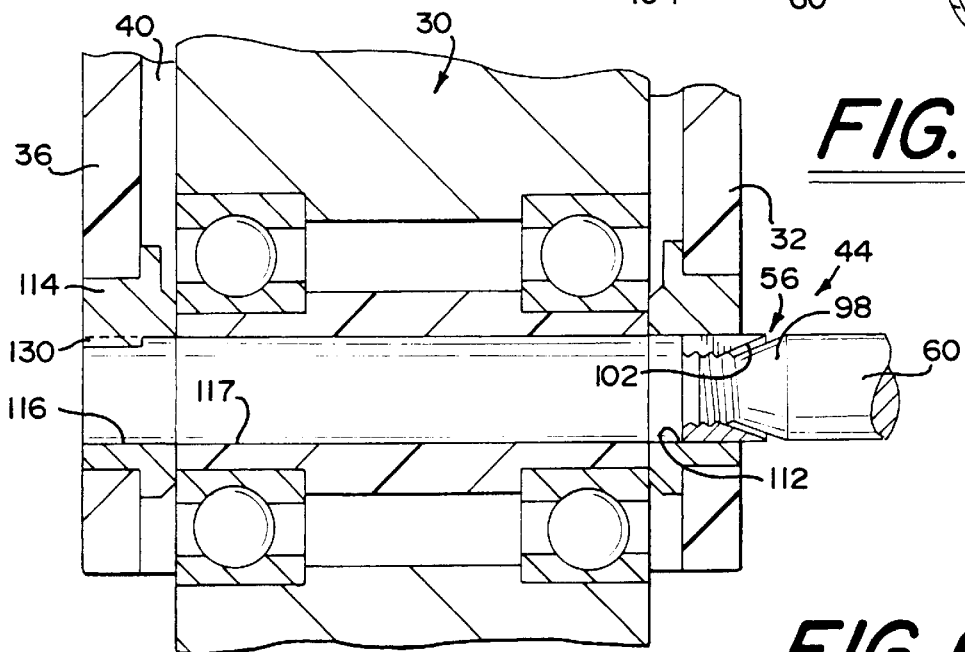
FIG. 4 is an illustration similar to that as shown in FIG. 2 in which nut spreading structures on the fastener and the nut are disengaged from the nut and the fastener to be withdrawn from the wheel assembly and the frame.
Figure 5:
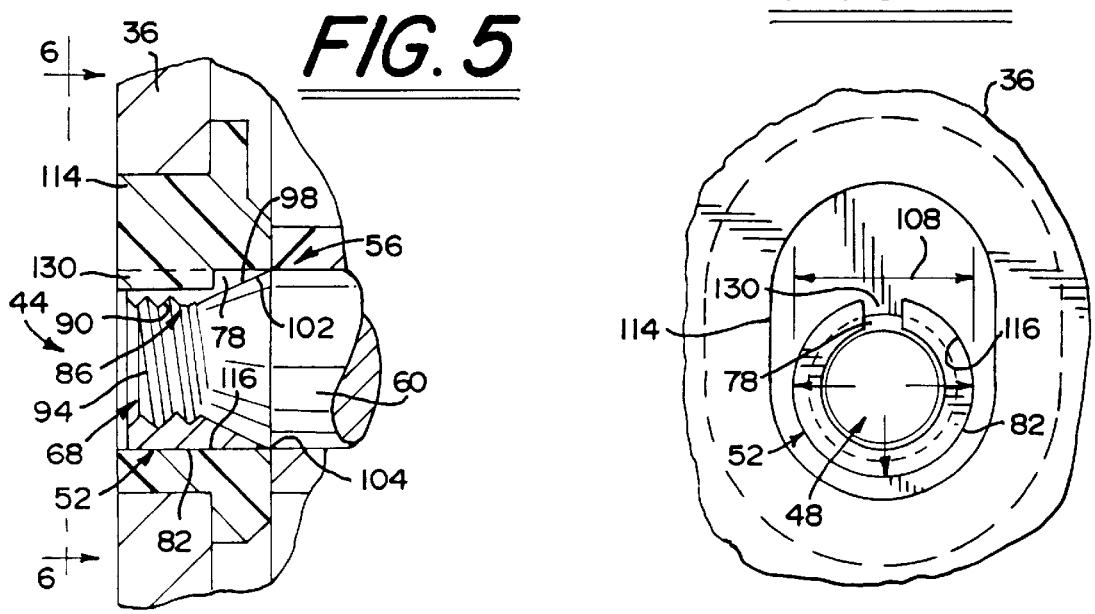
FIG. 5 is an enlarged view of a portion of the partial fragmentary, cross-sectional view of FIG. 2 showing a threaded portion of the fastener engaged with the nut.

Moving from FIG. 2 to FIG. 4, the drive structure 64 has been engaged and the fastener 48 has been rotated a nominal amount, for example, a quarter turn (approximately 90°) to disengage the nut spreading structures 56, thereby relieving the outward forces which engaged the exterior surface 82 of the nut with the interior surface of the axle aperture 116. Upon relieving the forces, the fastener system 44 may be withdrawn, axially, from the apertures 116,112 and the axle bore 126. Withdrawal of the fastener system 44 is shown in FIG. 4.

This system 44 is convenient in that the nut 52 is threadedly retained on the fastener 48 thereby providing a captive component system which minimizes or eliminates the loss of components. Further, this system 44 is efficient because threading is not required each time the fastener 48 is inserted into the wheel frame 28. Using prior art fasteners, the fastener would have to be inserted through the appropriate apertures and then the nut would have to be threaded from the opposite side. This is time consuming and unnecessary in view of the novel improvements provided by the present invention.

Figure 21:
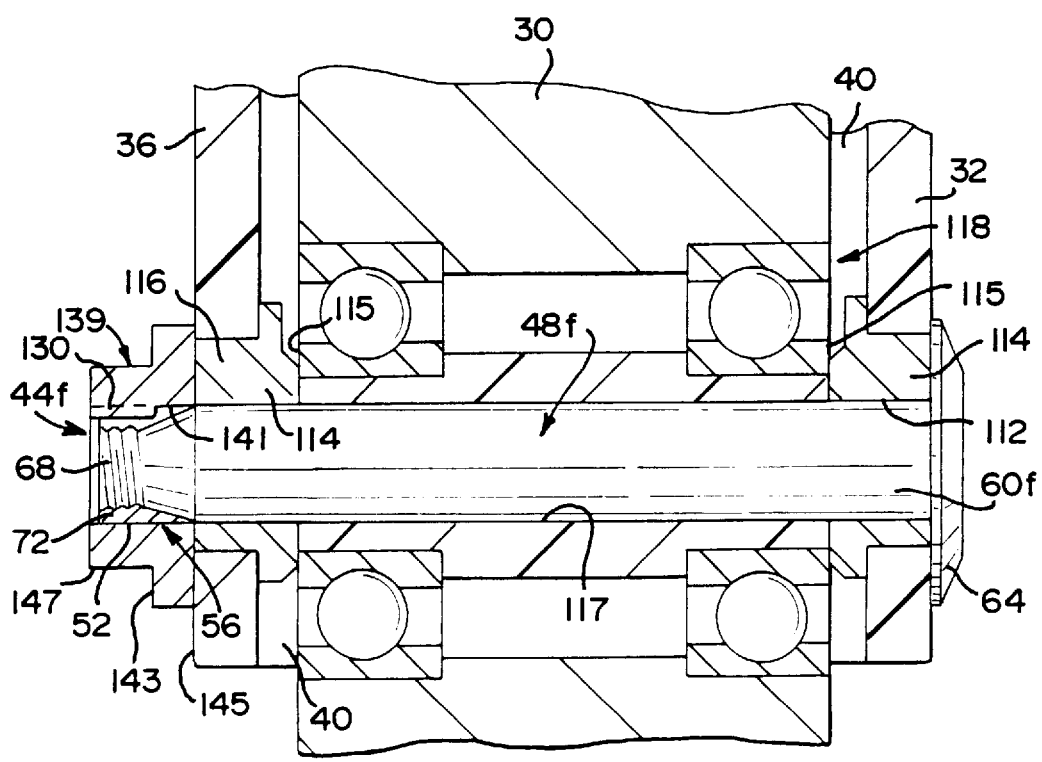
FIG. 21 is an enlarged, partial fragmentary, cross-sectional, elevational view of the wheel assembly and the portion of the frame similar to that as shown in FIG. 2 showing an alternate embodiment of the novel fastener system of the present invention using a receptacle positioned on the outboard side of the corresponding side rail with the fastener engaged with the expandable nut to retain the wheel assembly on the frame of the skate.

FIG. 21 shows an alternate embodiment of the invention which allows the fastener/axle system 44f to be used as a retrofitted assembly with an existing skate structure. In the embodiment as shown in FIG. 21, the system includes the fastener 48f, the nut 52 and a receptacle 139 which receives the nut 52. The receptacle 139 has a bore 141 which has a key 130 on the inside surface thereof The nut 52 is engaged with the bore 141 with the slot 78 mating with the key 130 as described hereinabove. A flange 143 of the receptacle 139 overlies an outboard surface 145 of the side rail 36. The flange 143 provides positive abutment of the receptacle 139 against the side rail 36 which prevents axial removal of the fastener 44f, receptacle 139 and the bushing 144 through the side rail 36.

The shank 60f of the fastener 48f is longer than the shank 60 of the fastener 48 shown in FIGS. 2–17 because the shank 60f must extend through the axle bore 117 and project beyond the outboard surface 145 of the side rail 36. By projecting beyond the side rail 36, the fastener system 44f may be used as a retrofitted assembly which can be used with existing bushings and wheel assemblies. In this regard the embodiment as shown in FIG. 21 does not require bushing having a key formed therein. The key in the embodiment in FIG. 21 is carried in the bore of the receptacle 139. An exterior surface 147 of the receptacle 139 is provided with a wrenching structure to receive and allow a wrenching tool to be engaged therewith. The fastener system 44f generally operates in the manner of the fastener system 44 as disclosed herein. The fastener 48f is inserted through the side wall 33, through the axle bore 117, through the side wall 36 with the nut 52 being inserted into the receptacle 139 upon aligning the key 130 in the slot 78. The fastener 48f is rotated to cause the nut 52 to be expanded with the outside surface of the nut 52 engaging the inside surface 141 of the receptacle 139.

Figure 8:
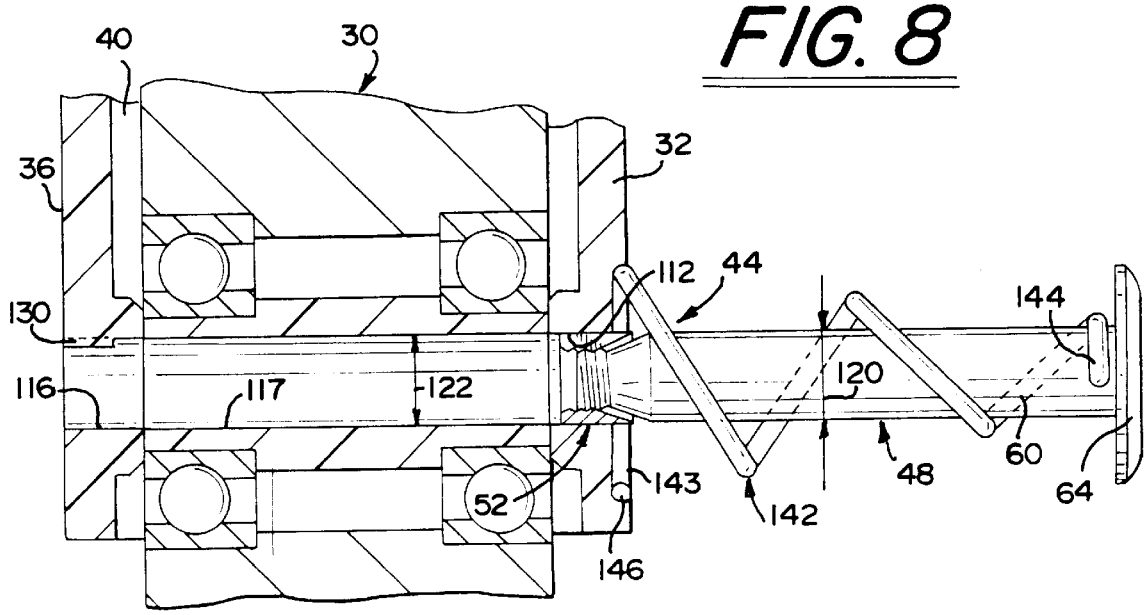
FIG. 8 is an enlarged, partial fragmentary, cross-sectional, elevational view of a captive conical nesting spring which is employed to disengage and retain a fastener and nut relative to a frame of an in-line skate.

Turning now to FIG. 8, an additional improvement is provided by the addition of a spring device 142 used with the fastener system 44 of the present invention. While a variety of spring devices or biasing devices 142 may be employed, a preferred embodiment of the spring device 142 is shown in FIG. 8 as a conical coiled compression spring. The spring 142 has outwardly positioned coils which allow the coils to nest in a recess 143 in the side rail 32 when the it is compressed providing a nominal profile. A first end 144 of the spring is attached to the shank 60 underneath the head 64. This retains the spring 142 as a captive piece on the fastener assembly 44. A second end 146 of the spring may be attached to the first side rail 32. Attachment of the spring to both the fastener and the side rail results in the fastener assembly 44 being a captive piece of hardware on the wheel frame 28.

The spring 142 is designed with a spring constant which, upon releasing rotation of the fastener, eject or removes the fastener system 44 from the second axle aperture 116 and the axle bore 117. As such, the spring constant will remove the fastener system 44 thus allowing removal of the wheel from the channel while still retaining the fastener system 44 on the wheel frame 28. The advantages of this captive arrangement are that none of the components can be removed from the wheel frame 28 in regular use. As such, use of the spring 142 with the fastener system 44 allows for quick and efficient removal and replacement of wheels on the wheel frame 28.

Figure 9:
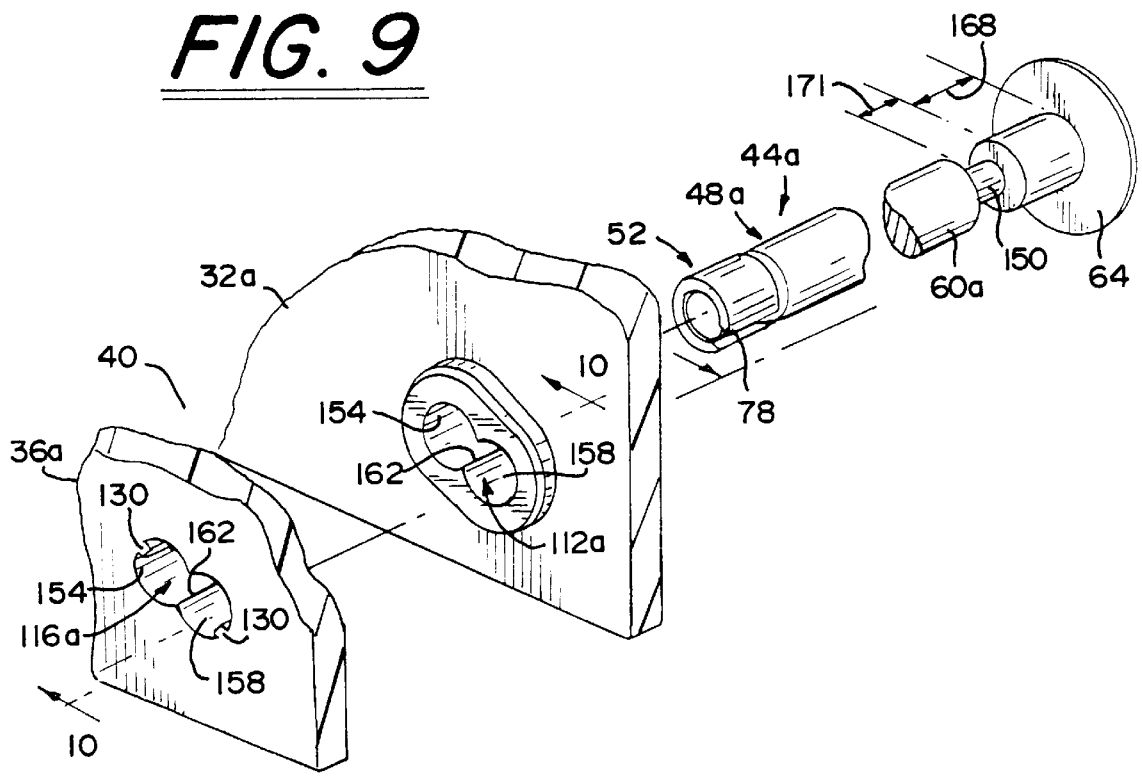
FIG. 9 is an enlarged, partial fragmentary, perspective view of an embodiment of the present invention which is used in a "rockering" system for adjusting in-line skate wheels.
Figure 10:
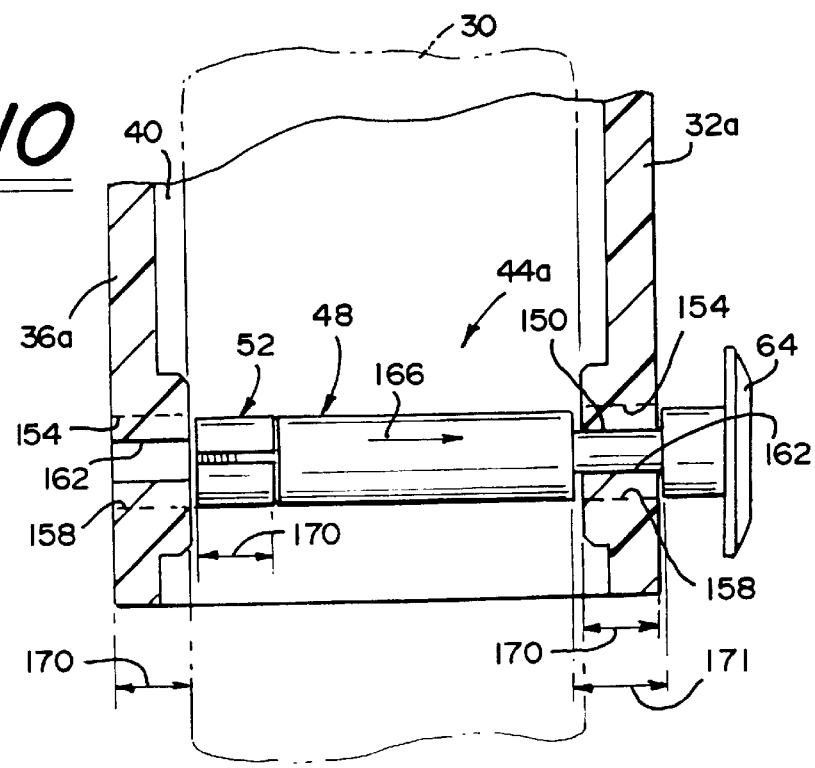
FIG. 10 is an enlarged, partial fragmentary, cross-sectional, elevational view of the fastener assembly as used in the "rockering" system shown in FIG. 9 showing an annular groove on the fastener positioned in a corresponding bore for adjusting the position of a wheel (shown in phantom line) associated therewith.

FIGS. 9 and 10 provide an alternate embodiment in which identical structures as those described in FIGS. 1–7 are represented by the same reference numerals and variations or alternate embodiments of the structures are represented by the same reference numerals with the addition of an alphabetic suffix, for example, fastener system 44a. As shown in FIGS. 9 and 10, the fastener system 44a is nearly identical to the fastener system 44 shown in FIGS. 1–7. In FIGS. 9 and 10, an annular groove 150 is provided on the shank 60a at a location spaced away from the head 64. Also, the first and second axle apertures 112a,116a are formed with two chambers, an upper chamber 154 and a lower chamber 158. The upper and lower chambers 154,158 are essentially overlapping bores in the first side rail and second side rail 32a,36a. The overlapping area creates a reduced diameter dimension passage 162. The upper and lower chambers 154,158 of the second axle aperture 112a include keys 130 sized for engaging the slot 78 of the nut 52.

The alternate embodiment as shown in FIGS. 9 and 10 allow the wheels which are attached to the wheel frame 28 to be "rockered". Rockering allows adjustment of individual wheels relative to the frame for a variety of purposes such as approximating a hockey style skate surface or for distributing loads. An example of an rockering structure as shown in the prior art, can be found in U.S. Pat. No. 5,028,058, issued Jul. 2, 1991 in the name of Olson. The rockering assembly as shown in Olson '058 includes plugs or bushings which include eccentric axle mounting bores. The plugs can be inverted to change the position of the bores thereby changing the position of the wheel within the frame. Additionally, while the bushings 114 are integrally formed in the side rails 32a 36a, it is envisioned that the chambers 154,158 as taught hereinabove may also be formed in removable bushings as shown in FIGS. 2–7.

While the device as shown in Olson '058 is useful for adjusting the wheels, it may be a time consuming and somewhat difficult process. The present invention allows for quick and efficient changing of the wheel adjustments. In the present invention, the fastener assembly 44a is inserted through the desired chamber 154,158 of the first axle aperture 116a to position the nut 52 in the corresponding chamber 154,158 of the second axle aperture 112a. The key 130 is engaged in the slot 78.

By way of example, moving the fastener assembly 44a from the lower chamber 158 to the upper chamber 154 to adjust the wheel upwardly in the frame is an efficient and uncomplicated process. First, the fastener 48a is rotated approximately one quarter turn, in accordance with the teachings as set forth hereinabove, to disengage the nut spreading structures 56. The fastener 48a with the nut 52 attached thereto is extracted generally axially (as indicated by direction arrow 166). The extraction is continued to a point where the annular groove 150 is aligned with the passage 162 in the first axle aperture 116a (see, FIG. 10). The position of the annular groove 150 along the shank 60 is at a dimension 168 which is approximately equal to a length dimension 170 of the nut 52 and the width 170 of the side rail 36a. Further, the length 171 of the groove 150 is slightly larger than the width 170 of the side rail 32a. As such, the groove 150 is aligned with the passage 162 at a position at which the nut 52 clears and is completely disengaged from the second axle aperture 112a.

With the fastener system 44a thus positioned, it is moved through the passage 162 to a position in the upper chamber 154. The slot 78 is aligned with the key 130, whereupon the fastener 48a and nut 52 can be inserted into the upper chamber 154 of the second axle aperture 112a. Once the nut 52 is positioned in the upper chamber 154, the fastener 48a is rotated approximately a quarter turn to once again engage the nut spreading structures 56 thereby spreading the nut 52 to retain the nut 52 in the upper chamber 154.

Figure 6:
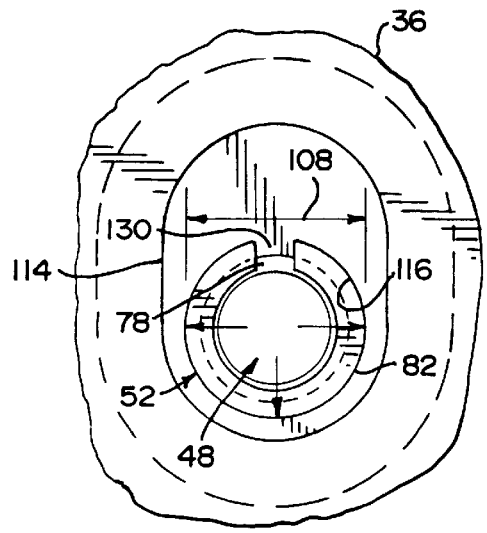
FIG. 6 is an elevational view taken along line 6—6 in FIG. 5 showing the engagement of the nut with the key when the fastener is threadedly engaged with the nut.

The generally diagonal orientation of the upper chamber 154 relative to the lower chamber 158 provides advantages in retaining the fastener assembly 44a in the axle apertures 112a,116a. For example, the apertures 112a,116a support the fastener assembly 44a and the wheel retained thereon against upward and downward forces. As shown in FIG. 6, the upper and lower chambers 154,158 provide internal surfaces for supporting the fastener assembly and the wheel attached thereto against upward and downward forces. Additionally, lateral forces are clearly and completely supported in at least one direction relative to each of the chambers 154,158. Moreover, even lateral forces directed from each of the chambers 154,158 towards the passage 162 are nearly completely supported as a result of the upper rim 174 and lower rim 178 associated with each passage 162.

Figure 7:
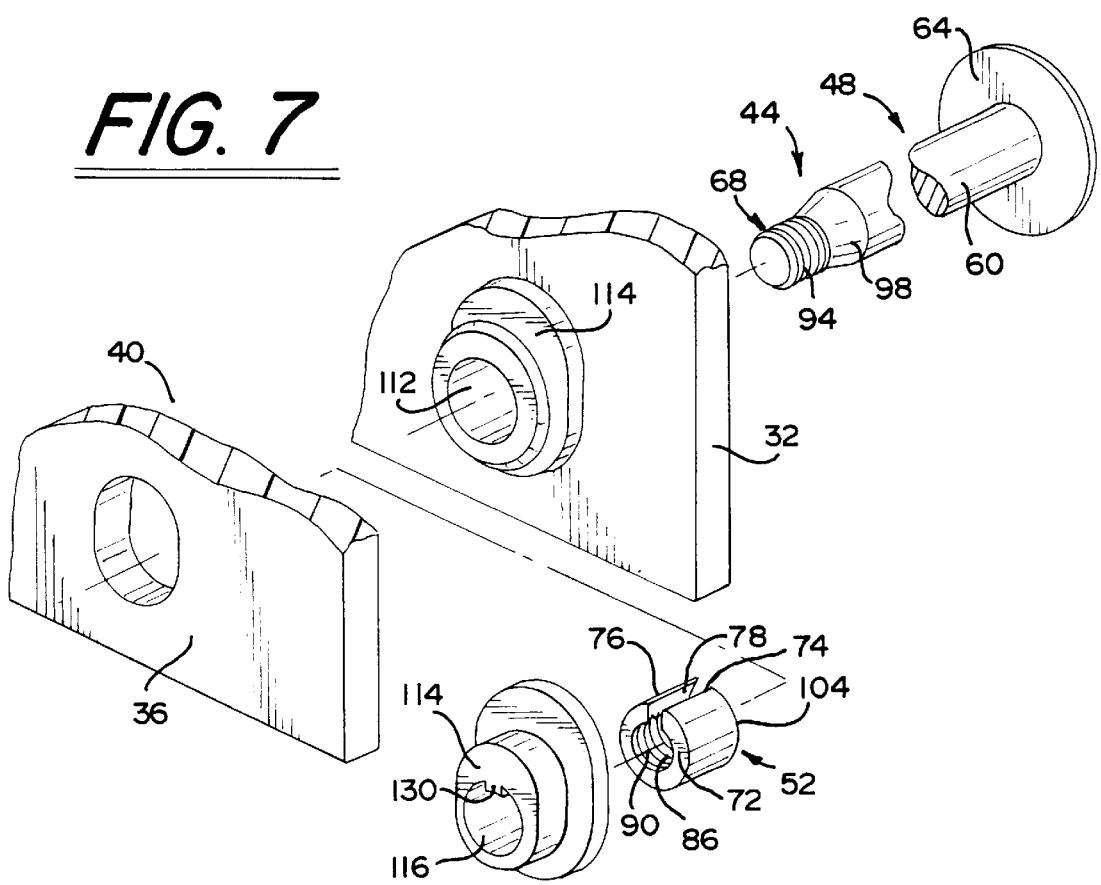
FIG. 7 is an enlarged, partial fragmentary, exploded, perspective view of the fastener system of the present invention as used with a wheel assembly as shown in FIG. 1 further illustrating a corresponding portion of the frame, insert bushings, and the fastener assembly.

It should be noted that the spring 142 discussed hereinabove may be employed with the adjustment structures as set forth in FIGS. 6 and 7. In fact, the spring would be highly applicable in the adjustment configuration to limit the degree of extension of the fastener from the apertures 112a,116a. In order to use the spring in the embodiment as shown in FIGS. 6 and 7, the spring constant of the spring and the overall dimensions must be selected so that a desired degree of extension is achieved. One having ordinary skill in the art employing the teachings of the present invention is believed to be able to determine the necessary spring constant in order to disengage, for example, only the nut 52 from the second axle aperture 112a.

Figure 11:
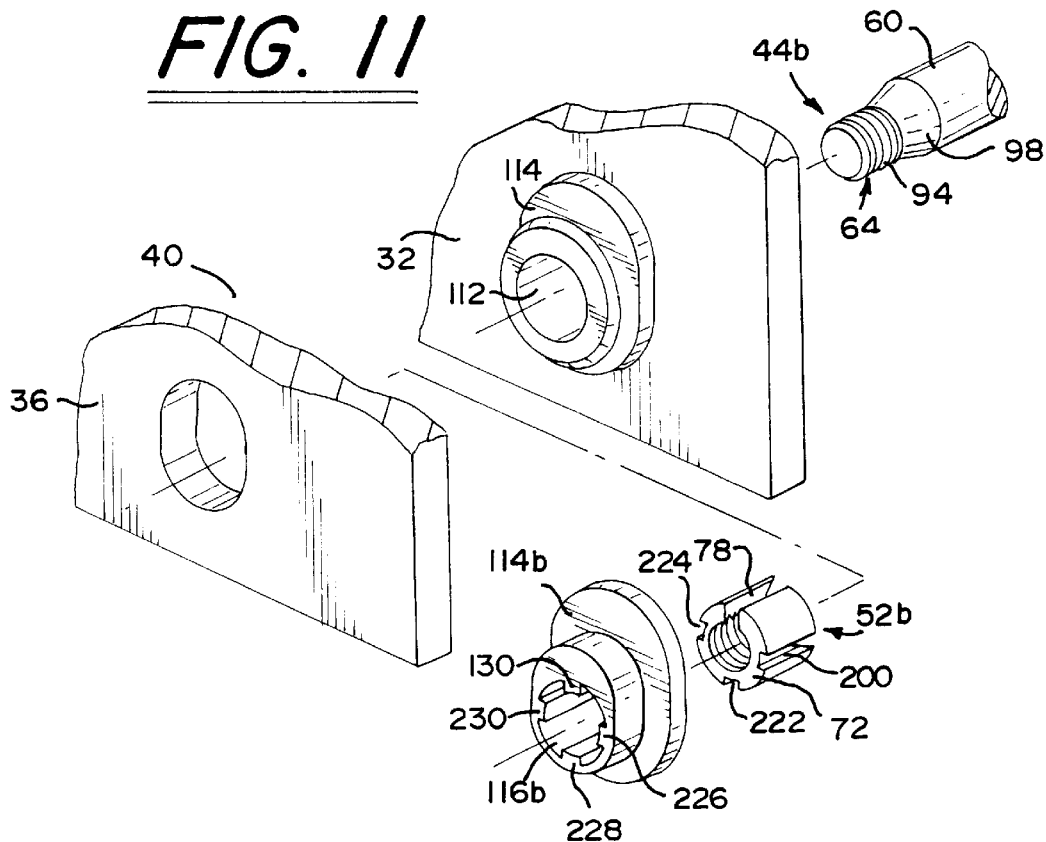
FIG. 11 is an enlarged, partial fragmentary, exploded, perspective view of the fastener system of the present invention similar to that as shown in FIG. 7 in which the fastener system employs a nut having four slots formed in an outside surface thereof.
Figure 12:
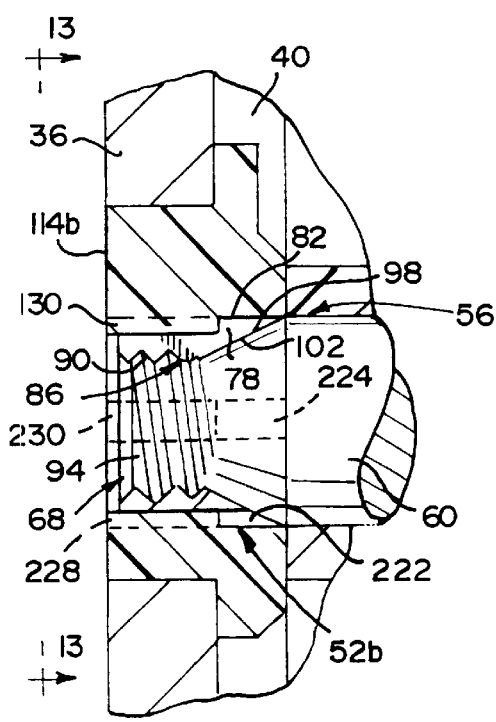
FIG. 12 is an enlarged, partial fragmentary, cross-sectional, elevational view of the threaded portion of the fastener engaged with the nut of FIG. 11 showing the position of three of the slots which are engaged by corresponding keys formed in the bore of the bushing.
Figure 13:
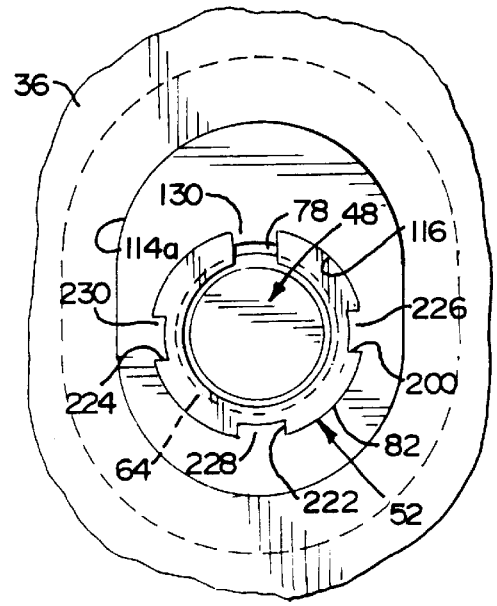
FIG. 13 is an elevational view taken along line 13—13 in FIG. 12 showing the arrangement of the nut with four slots engaged with the corresponding keys when the fastener is threadedly engaged with the nut.

FIGS. 11–13 show an alternate embodiment of the nut of the present invention. As shown in FIGS. 11–13, the structures which are identical to those as shown and described in preceding figures use the same reference numbers variations of the structures are shown using an alphabetic suffix, for example, the nut 52b.

Essentially, the difference between the nut 52b as shown in FIGS. 11–13 and the nut 52 as shown in FIGS. 1–7 is that the nut 52b includes a plurality of slots 78, 220, 222, 224. Correspondingly, a plurality of keys 130, 226, 228, 230 are provided in the axle bore 116b of the bushing 114b. The slot 78 and the corresponding key 130 provide the same engagement as shown in FIGS. 1–7. The slots 220, 222, 224 are different from the slots 78 in that they do not extend completely through the wall 72 of the nut body 52b. Generally, the keys 130, 226, 228, 230 are of identical dimension to allow engagement with any of the slots. As such, although the engagement of the slot 78 with the key 130 as shown in FIG. 13 is similar to that as shown in FIG. 6, the nut 52b may be rotated to allow engagement of the nut 52b in any orientation relative to the keys, for instance, engagement of the key 230 with the slot 78.

The purpose of the plurality of slots and keys is to allow the nut to be inserted, properly located and retained against rotation with little effort. While the nut structure 52 as shown in FIGS. 2–7 retains the nut 52 against rotation, it may require a rotation in order to locate the key 130 in the slot 78. As such, the embodiment as shown in FIGS. 11–13 allows one of the keys 130, 226, 228, 230 to be engaged with one of the slots 78, 220, 222, 224 upon rotation of no more than approximately 90°. The nut 52b with a plurality of slots helps to expedite the location of the nut in the bore 116b.

Figure 14:
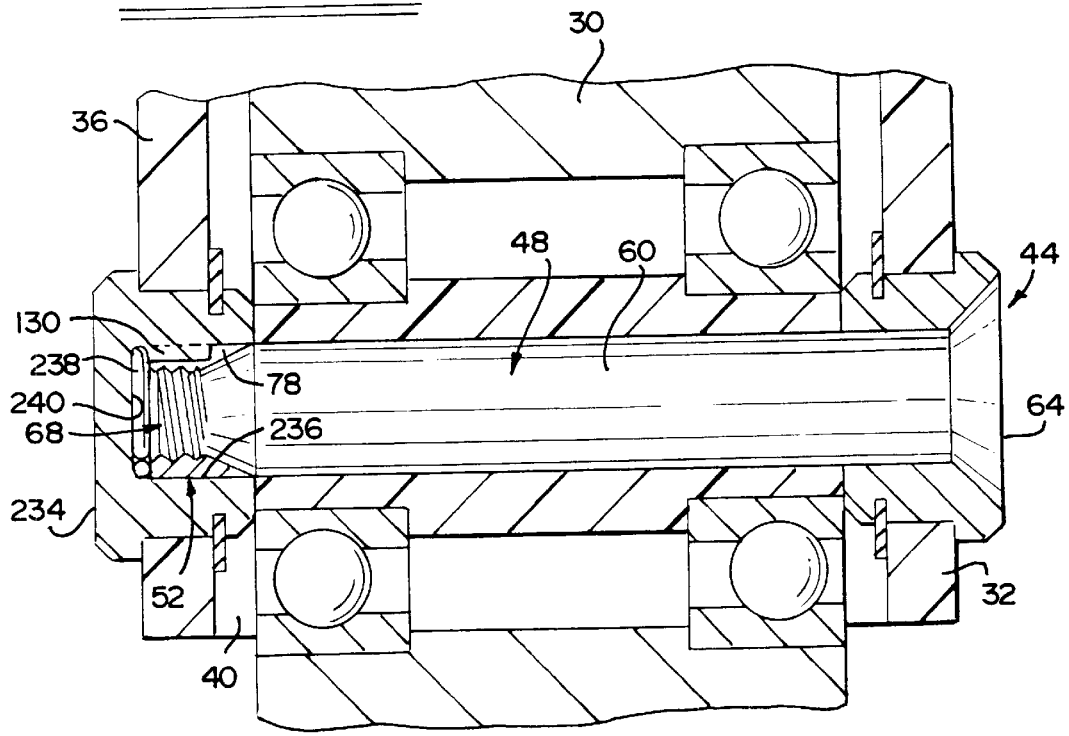
FIG. 14 is an enlarged, partial fragmentary, cross-sectional, elevational view of a nesting spring which is retained in one of the bushings to drive against the fastener and nut once the fastener and nut are disengaged to disengage the nut from the bushing and further showing the fastener and nut in the engaged configuration in which the spring is conically coiled in the bushing.
Figure 15:
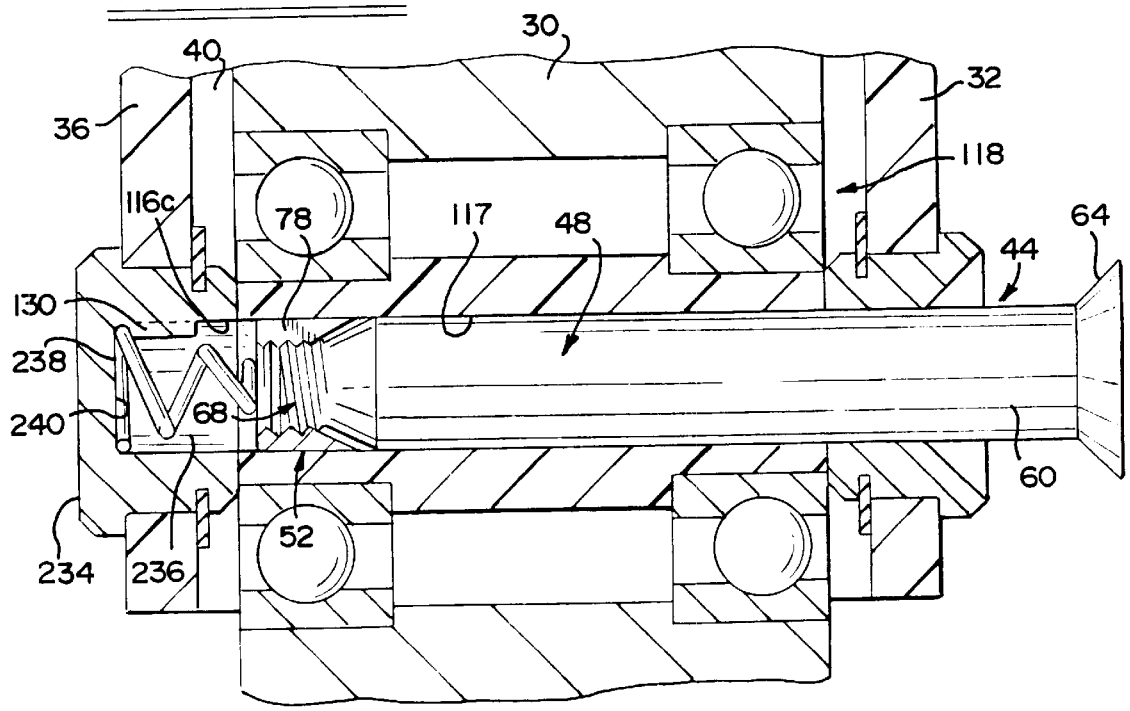
FIG. 15 is an enlarged view similar to FIG. 14 and in which the nut and fastener have been disengaged thereby allowing the spring to expand against the nut and fastener to axially displace the nut and fastener through the axle bore.

Turning now to FIGS. 14 and 15, another alternate embodiment of the present invention is shown. In the embodiment as shown in FIGS. 14 and 15, a bushing 234 is provided which defines a cavity 236. The cavity 236 defines an aperture 116c in which the nut 52 is retained and engaged to retain the fastener assembly 44 in engagement with the side walls 32, 36 and the wheel assembly 30. Additionally, a conical coiled spring 238 is positioned between an end wall 240 of the cavity 236 and the end of the nut 52 and fastener 48. The conical coiled spring 38 is coiled spirally inwardly on itself when the nut 52 is engaged in the bore 116c. When the fastener 60 is rotated a quarter turn, approximately 90°, relative to the nut 52, the forces are relieved between the nut 52 and the bore 116c thereby allowing the nut to be disengaged from the bore 116c. The spring 238 is provided with a spring constant of sufficient force to push the released fastener assembly generally axially along and through the axle bore 117.

The coiled spring 238 assures that the skate user will notice that the fastener 48 is extending from the side rail 32 thereby providing a fail safe mechanism. Additionally, the spring 238 helps to eject or remove the fastener assembly 44 from the frame and wheel assembly 30 once disengaged therefrom thereby facilitating easier removal of the fastener assembly 44.

Figure 16:
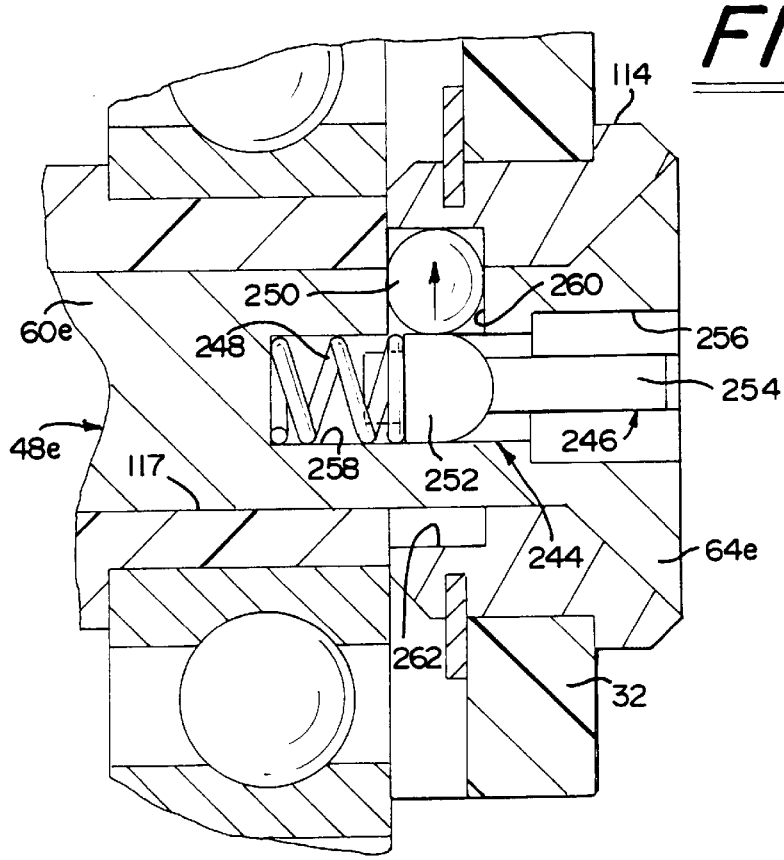
FIG. 16 is an enlarged, partial fragmentary, elevational view of a ball detent assembly of the fastener assembly of the present invention in which a ball is engaged with a recess in a bushing to retain the fastener and nut in engagement through the axle bore to prevent disengagement of the fastener system from the axle bore in the event the fastener is not engaged or tightened with the nut.
Figure 17:
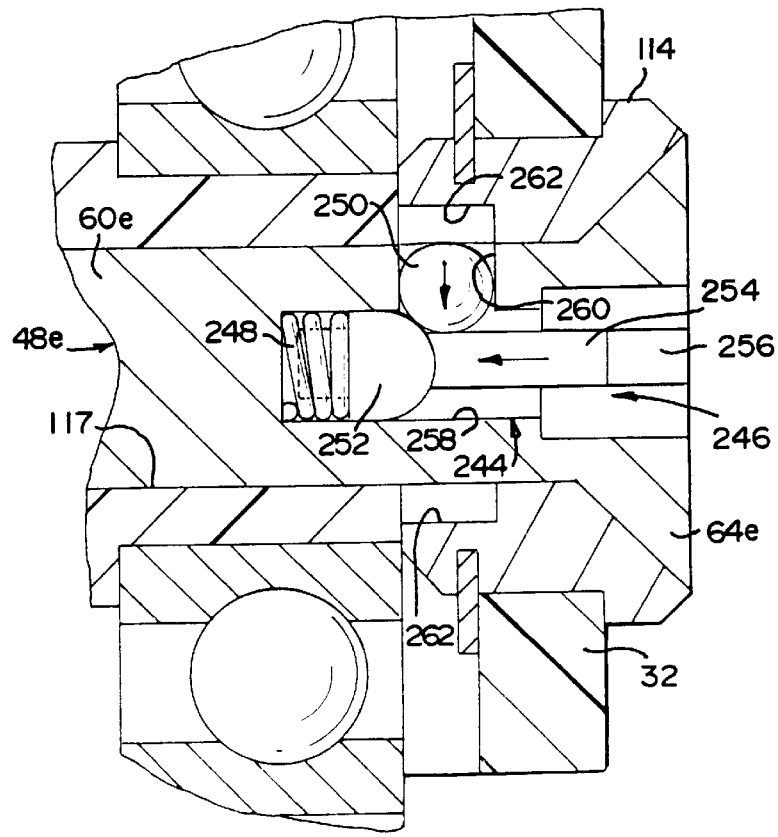
FIG. 17 is a view similar to that as shown in FIG. 16 in which the ball detent's assembly has been actuated to disengage the ball from the recess to allow the fastener system to be withdrawn from the axle bore.

FIGS. 16 and 17 show another alternate embodiment of the present invention which includes a ball detent assembly 244 which is disposed on the driving end 64e and a portion of the shank 60e of the fastener 48e. The ball detent assembly includes a plunger structure 246, a biasing spring 248 and an engaging ball 250. The plunger includes a ball moving portion 252 and a shaft portion 254. The shaft portion extends into a drive tool recess 256 formed in the head 64e of the fastener 48e.

The plunger assembly 246 is retained in a plunger bore 258 with the shaft extending from the bore 258 into the recess 256. The ball 250 is retained in a second bore 260 which communicates with the plunger bore 258. The spring 248 is retained between the ball moving body 252 in the bore 258.

It should be noted that the walls of the secondary bore 260 taper inwardly to retain the ball therein and prevent the ball from being removed therefrom. The ball 250, when extending from the bore 260, engages a recess 262 formed in the bushing 114. As shown in FIG. 16, the ball 250 is extended into the recess 262 to retain the fastener in engagement with the bushing 114 regardless of whether the nut (not shown in FIG. 16 or FIG. 17 but shown in FIGS. 2–15) is engaged with the corresponding bushing. In other words, regardless of whether the fastener is rotated to cause the nut to expand thereby retaining the fastener assembly in axial alignment in the wheel assembly, the ball detent assembly 246 will retain the fastener assembly therein. This ball detent mechanism provides a fail safe mechanism to retain the fastener and prevent the wheel from becoming dislodged from the frame.

Turning to FIG. 17, the ball detent assembly has been disengaged such that the ball 250 is removed from the recess 262 and allowed to travel through the secondary bore 260 and partially into the bore 258. The ball 250 is disengaged from the recess 262 by axially displacing the shaft 254. Axial displacement of this shaft occurs when a tool (not shown in the interest of clarity) is inserted into the tool receiving recess 256. Upon inserting the tool the shaft and body 254, 252 compress the spring 248. Upon compressing the spring, the body 252 moves to the left (relative to FIG. 17) thereby providing clearance for the ball 250 to travel through the secondary bore 260.

Once the ball is disengaged, a slight canting action to the tool which is used to rotate the fastener 60e a quarter turn, will act to hold the fastener 60e from the axle bore 117. Additionally, the spring disengaging embodiment of the present invention employing the spring 238 as shown in FIGS. 14 and 15 may be used with this ball detent assembly. In this regard, once the ball 250 is disengaged from the recess 262, the spring 238 will act to axially displace the fastener assembly a sufficient distance so as to maintain the ball 250 in the disengaged position (as shown in FIG. 17).

Figure 18:
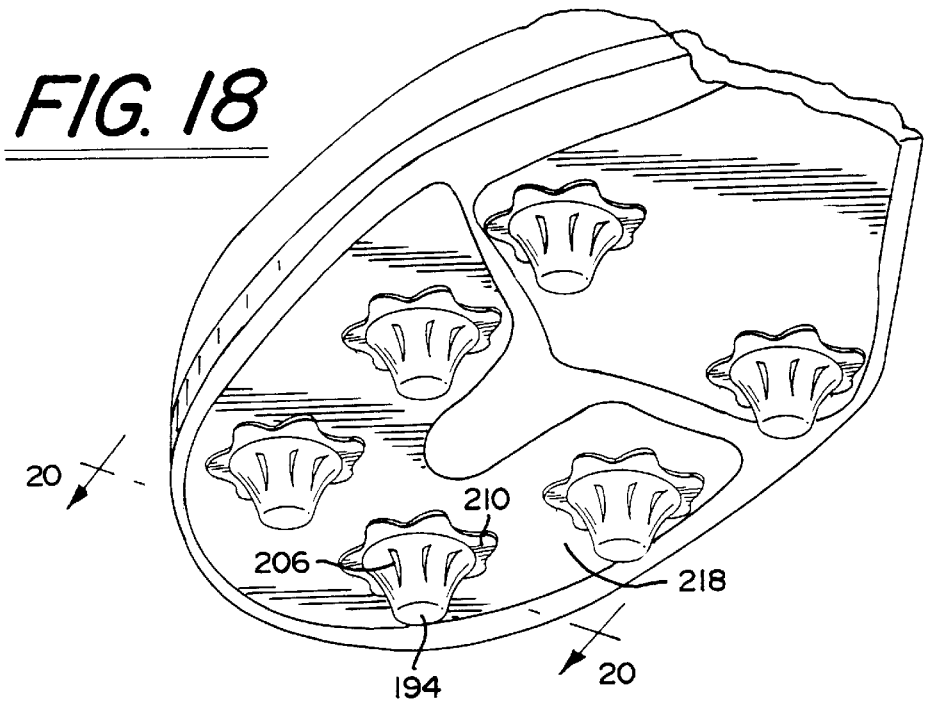
FIG. 18 is a bottom perspective view of a shoe sole which is used on footwear with cleats attached thereto.
Figure 19:
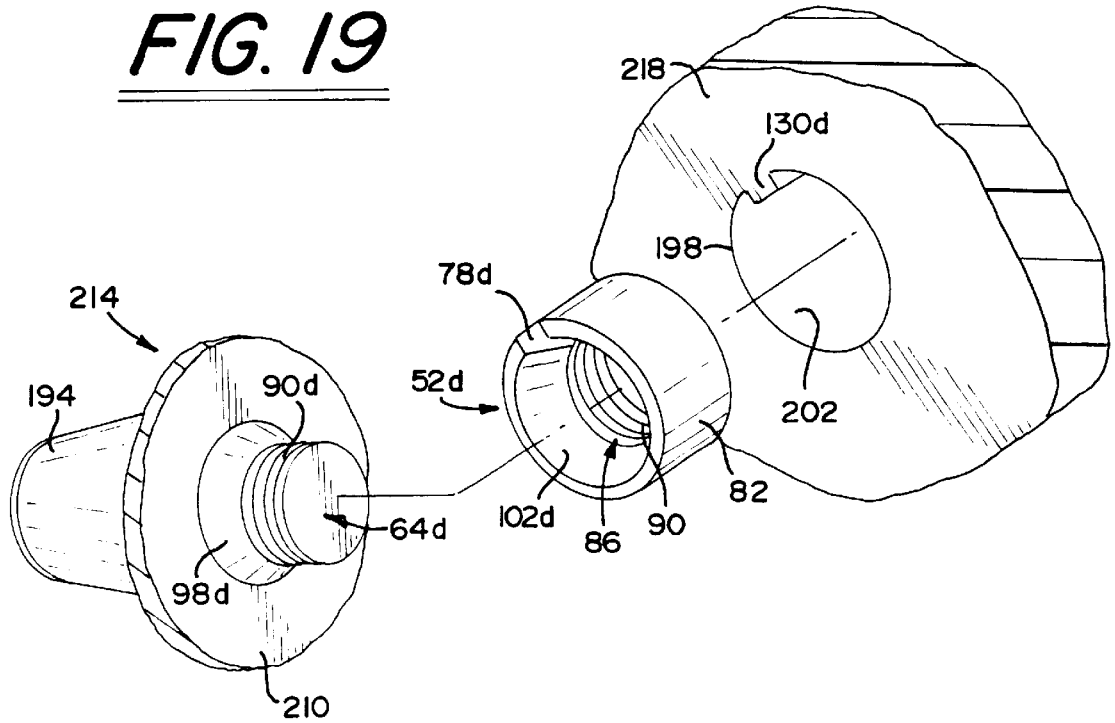
FIG. 19 is an enlarged, exploded, perspective view of the cleat as shown in FIG. 18, further illustrating a nut, threaded portion on the cleat and a bore having a key therein for receiving the nut and cleat.
Figure 20:
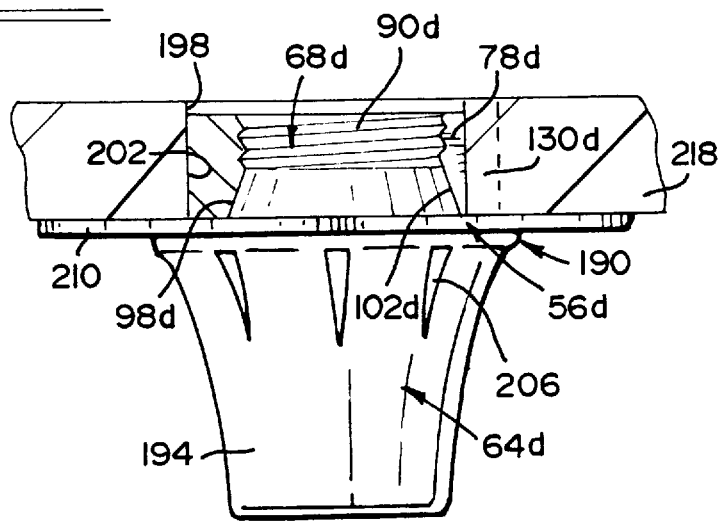
FIG. 20 is a partial-fragmentary, cross-sectional, side elevational view of a cleat assembly in accordance with the teachings of the present invention taken along line 20—20 in FIG. 18 showing a stud and nut engaged in a bore in the sole.

Turning now to a further embodiment of the present invention, FIGS. 18–20 show a cleat assembly 182 which employs the basic structures and teachings of the fastener assembly of the present invention. FIG. 18 shows a plurality of such cleat assemblies 182 engaged in a workpiece 186 shown herein in the form of a sole for a shoe. The cleat assemblies provide for fast, efficient and reliable engagement, removal and replacement of a cleat. More specifically, as shown in FIG. 19, the cleat assembly includes a cleat body 190, and an expandable nut member 52d, having a cylindrical outer surface 82 and a through slot 78d. The cleat body 190 includes a protruding head portion 194, a shank including a threaded portion 68d and a drive structure 64d. The nut spreading structure 56d includes a fastener tapered surface 98d and a nut tapered surface 102d. The sole assembly 186 includes a bore 198, an inside surface 202 of which includes a key 130d. Operation of the cleat follows the teachings as set forth hereinabove. The drive structure 64d as shown herein includes indents 206 which are formed on outside surface of the protruding head portion 94 as well as engaging structures 210 formed on an annular flange 214. One form of the engaging structures 210 on the annular flange 214 is the TORX®, a registered trademark of Camcar Division of Textron Inc. Either form of the drive structure may be acceptable in and of itself or may be combined to provide additional driving advantages. The flange 214 provides additional surface area of forced distribution on a bottom portion 218 of the sole 186.

Thus with the design or assembly 182, the assembly is engaged in the bore 198, with the key 130d disposed in slot 78d to prevent rotation of the nut member 52d. Once initially assembled, the cleat is rotated a quarter turn. This will bring the tapered surfaces 98d and 102d into engagement. Further, since the nut member 52d cannot rotate, the advancement of the threaded portion 68d and the engagement of surface 98d and 102d, will cause the nut member 52d to expand, and bring the outer surface 82 into frictional engagement with the wall surface 202 of bore 198. This engagement will maintain the cleat in assembly, with the quarter turn, quick release portion of the assembly 182 providing for ease of use in the mounting and removal of the cleats to the sole 218 of the shoe.

While a preferred embodiment of the present invention is shown and described, it is envisioned that those skilled in the art may devise various modifications and equivalents without departing from the spirit and scope of the invention as defined by the appended claims. The invention is not intended to be limited by the foregoing disclosure.

I claim:

1. A fastener system for attaching a wheel assembly to a roller skate, said roller skate having a frame including spaced apart first and second side rails defining a channel therebetween, at least one wheel assembly having a wheel axle bore, each of said side rails having an axle aperture generally coincident with a corresponding one of said wheel axle bores, said fastener system comprising:

a fastener having a shank providing a wheel axle, a drive structure on one end of said shank and a threaded portion on said shank generally opposite said driving structure;

a nut body having a wall defining an interior surface and an exterior surface, at least one slot formed in said exterior surface of said nut body with at least one of said at least one slot completely extending through said wall, and one end of said nut body defining a leading end, a threaded portion positioned on said interior surface of said nut body for threadely receiving said threaded portion of said shank;

nut spreading structures on said fastener and said leading end of said nut body for spreading and expanding said nut body;

said fastener extending through said axle aperture of said first side rail, through said axle bore of said wheel and positioned at least proximate to a second axle aperture in said second side rail, said nut body being positioned in said second axle aperture in said second side rail for mounting engagement with an interior surface of said second axle aperture, further including a key on said interior surface of said second axle aperture, said key being received in said slot for preventing rotation of said nut body upon rotation of said fastener to engage said nut spreading structures.

2. A fastener system for attaching a wheel assembly to a roller skate, said roller skate having a frame including spaced apart first and second side rails defining a channel therebetween, at least one wheel assembly having a wheel axle bore, each of said side rails having an axle aperture generally coincident with a corresponding one of said wheel axle bores, said fastener system comprising:

a fastener having a shank providing a wheel axle, a drive structure on one end of said shank and a threaded portion on said shank generally opposite said driving structure;

a nut body having a wall defining an interior surface and an exterior surface, at least one slot formed in said exterior surface of said nut body with at least one of said at least one slot completely extending through said wall, and one end of said nut body defining a leading end, a threaded portion positioned on said interior surface of said nut body for threadely receiving said threaded portion of said shank;

nut spreading structures on said fastener and said leading end of said nut body for spreading and expanding said nut body;

said fastener extending through said axle aperture of said first side rail, through said axle bore of said wheel and positioned at least proximate to a second axle aperture in said second side rail, said nut body being positioned in said second axle aperture in said second side rail for mounting engagement with an interior surface of said second axle aperture, said fastener including a tapered surface; and a nut tapered surface on said leading end of said nut body, said nut tapered surface tapering outwardly from said interior surface of said nut body towards said leading end; said threaded portion of said shank and said threaded portion of said nut body being dimensioned for engaging said fastener tapered surface and said nut tapered surface upon rotation of said fastener approximately 90° relative to said nut body.

3. A fastener system for attaching a wheel assembly to a roller skate, said roller skate having a frame including spaced apart first and second side rails defining a channel therebetween, at least one wheel assembly having a wheel axle bore, each of said side rails having an axle aperture generally coincident with a corresponding one of said wheel axle bores, said fastener system comprising:

a fastener having a shank providing a wheel axle, a drive structure on one end of said shank and a threaded portion on said shank generally opposite said driving structure;

a nut body having a wall defining an interior surface and an exterior surface, at least one slot formed in said exterior surface of said nut body with at least one of said at least one slot completely extending through said wall, and one end of said nut body defining a leading end, a threaded portion positioned on said interior surface of said nut body for threadely receiving said threaded portion of said shank;

nut spreading structures on said fastener and said leading end of said nut body for spreading and expanding said nut body;

said fastener extending through said axle aperture of said first side rail, through said axle bore of said wheel and positioned at least proximate to a second axle aperture in said second side rail, said nut body being positioned in said second axle aperture in said second side rail for mounting engagement with an interior surface of said second axle aperture, said first and second axle apertures having an upper chamber and a lower chamber, said upper and lower chambers being connected by a passage therebetween, said fastener being moveable from one of said upper and lower chambers to the other of said upper and lower chambers for adjusting said wheel assembly relative to said first and second side rails, said second axle aperture further including a key extending from an inside surface of each of said upper chamber and said lower chamber for engaging said slot in said nut body when said nut body is positioned in one of said upper and lower chambers.

4. A fastener system for attaching a wheel assembly to a roller skate, said roller skate having a frame including spaced apart first and second side rails defining a channel therebetween, at least one wheel assembly having a wheel axle bore, a first and second axle aperture in said first and second side rails, respectively, generally coincident with said wheel axle bore, said fastener system comprising:

a fastener having a shank providing a wheel axle, a driving structure on one end of said shank and a threaded portion on said shank generally opposite said driving structure;

a nut body having a wall defining an inside surface and an outside surface, at least one slot formed in said outside surface of said nut body with one of said at least one slot completely extending through said wall, and one end of said nut body defining an entry end;

nut spreading structures on said fastener and said entering end of said nut body for spreading and expanding said nut body;

a receptacle having a bore for receiving said nut, said receptacle being positioned on an outboard surface of said second side rail generally opposite said driving structure;

said fastener extending through said first axle aperture of said first side rail, through said axle bore of said wheel assembly and through said second axle aperture in said second side rail, said nut body being positioned in said receptacle for engagement with an interior surface of said bore in said receptacle.

5. A fastener system as recited in claim 4, further including a key on said interior surface of said bore of said receptacle, said key being received in said slot for preventing rotation of said nut body upon rotation of said fastener to engage said nut spreading structures.

6. A fastener system as recited in claim 4, said nut spreading structures further comprising:

a fastener tapered surface on said fastener between said threaded portion and said shank, said fastener tapered surface tapering from said shank inwardly towards said threaded portion.

7. A fastener system as recited in claim 4, said threaded portion and said threads in said nut body being dimensioned for engaging said fastener tapered surface and said nut tapered surface upon rotation of said fastener approximately 90° relative to said nut body;

a nut tapered surface on said entry end of said nut body, said nut tapered surface tapering outwardly from said inside surface of said nut body towards said entry end.

8. A fastener system for attaching a wheel assembly to a roller skate, said roller skate having a frame including spaced apart first and second side rails defining a channel therebetween, at least one wheel assembly having a wheel axle bore, each of said side rails having an axle aperture generally coincident with a corresponding one of said wheel axle bores, said fastener system comprising:

a fastener having a shank providing a wheel axle, a drive structure on one end of said shank and a threaded portion on said shank generally opposite said driving structure;

a nut body having a wall defining an interior surface and an exterior surface, at least one slot formed in said exterior surface of said nut body with at least one of said at least one slot completely extending through said wall, and one end of said nut body defining a leading end;

nut spreading structures on said fastener and said entering end of said nut body for spreading and expanding said nut body;

said fastener extending through said axle aperture of said first side rail, through said axle bore of said wheel and positioned at least proximate to a second axle aperture in said second side rail, said nut body being positioned in said second axle aperture in said second side rail for mounting engagement with an interior surface of said second axle aperture; and a key on said interior surface of said second axle aperture, said key being received in said slot for preventing rotation of said nut body upon rotation of said fastener to engage said nut spreading structures.

9. A fastener system for attaching a wheel assembly to a roller skate, said roller skate having a frame including spaced apart first and second side rails defining a channel therebetween, at least one wheel assembly having a wheel axle bore, each of said side rails having an axle aperture generally coincident with a corresponding one of said wheel axle bores, said fastener system comprising:

a fastener having a shank providing a wheel axle, a drive structure on one end of said shank and a threaded portion on said shank generally opposite said driving structure;

a nut body having a wall defining an interior surface and an exterior surface, at least one slot formed in said exterior surface of said nut body with at least one of said at least one slot completely extending through said wall, and one end of said nut body defining a leading end;

nut spreading structures on said fastener and said leading end of said nut body for spreading and expanding said nut body;

said fastener extending through said axle aperture of said first side rail, through said axle bore of said wheel and positioned at least proximate to a second axle aperture in said second side rail, said nut body being positioned in said second axle aperture in said second side rail for mounting engagement with an interior surface of said second axle aperture;

said first and second axle apertures having an upper chamber and a lower chamber, said upper and lower chambers being connected by a passage therebetween, said fastener being moveable from one of said upper and lower chambers to the other of said upper and lower chambers for adjusting said wheel assembly relative to said first and second side rails; and said second axle aperture further including a key extending from an inside surface of each of said upper chamber and said lower chamber for engaging said slot in said nut body when said nut body is positioned in one of said upper and lower chambers.

\* \* \* \* \*